(12) United States Patent
Dutilleul et al.

(10) Patent No.: US 6,312,024 B1
(45) Date of Patent: Nov. 6, 2001

(54) THREADED ASSEMBLY OF METAL TUBES DESIGNED TO CONTAIN A CORROSIVE FLUID

(75) Inventors: Pierre Dutilleul, Jenlain; Thierry Noel, Sebourg, both of (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 09/424,562

(22) PCT Filed: Mar. 19, 1999

(86) PCT No.: PCT/FR99/00633

§ 371 Date: Nov. 24, 1999

§ 102(e) Date: Nov. 24, 1999

(87) PCT Pub. No.: WO99/49171

PCT Pub. Date: Sep. 30, 1999

(30) Foreign Application Priority Data

Mar. 26, 1998 (FR) .................................................. 98 03740

(51) Int. Cl.[7] ........................................................ F16L 9/14
(52) U.S. Cl. ............................................. 285/333; 285/55
(58) Field of Search ........................................ 285/333, 334, 285/390, 355, 383, 55

(56) References Cited

U.S. PATENT DOCUMENTS

| 2,086,151 | * | 7/1937 | Bannerman | 285/55 |
|---|---|---|---|---|
| 3,100,656 | | 8/1963 | MacArthur . | |
| 3,167,333 | * | 1/1965 | Hall et al. | 285/333 X |
| 3,482,007 | | 12/1969 | Routh . | |
| 3,968,552 | * | 7/1976 | Hunter | 285/55 X |
| 4,161,319 | | 7/1979 | Stocking . | |
| 4,619,470 | * | 10/1986 | Overath et al. | 285/55 |
| 4,619,472 | * | 10/1986 | Kozono et al. | 285/334 |
| 4,679,831 | * | 7/1987 | Kielminski | 285/333 X |
| 4,712,815 | * | 12/1987 | Reeves | 285/334 |
| 5,137,310 | * | 8/1992 | Noel et al. | 285/333 |
| 5,236,230 | * | 8/1993 | Mudge, Jr. et al. | 285/55 |
| 5,282,652 | | 2/1994 | Werner . | |
| 5,470,111 | | 11/1995 | Nelson et al. . | |
| 5,689,871 | | 11/1997 | Carstensen . | |
| 5,769,466 | * | 6/1998 | Noel et al. | 285/334 X |
| 5,906,399 | * | 5/1999 | Noel | 285/55 |
| 6,176,524 | * | 1/2001 | Tsuru et al. | 285/55 |

FOREIGN PATENT DOCUMENTS

| 1 068 068 | 10/1959 | (DE) . |
|---|---|---|
| 1 234 162 | 7/1964 | (DE) . |
| 0 212 288 | 3/1987 | (EP) . |
| 0 759 497 | 2/1997 | (EP) . |
| 1 486 508 | 5/1967 | (FR) . |
| 1 489 013 | 6/1967 | (FR) . |
| 2 286 332 | 4/1976 | (FR) . |
| 2 117 469 | 10/1983 | (GB) . |

\* cited by examiner

Primary Examiner—Lynne H. Browne
Assistant Examiner—David E. Bochna
(74) Attorney, Agent, or Firm—Oblon, Spivak, McClelland, Maier & Neustadt, P.C.

(57) ABSTRACT

An integral or threaded and coupled connection between two metal pipes which are provided with an internal coating to contain a corrosive fluid. The male part of the connection includes a threaded portion and a non-threaded portion with the non-threaded portion having a metal sealing surface, an annular transverse bearing surface and a nose surface. The nose surface joins the internal peripheral surface of the pipe by way of an annular radial surface termed the internal end. The female part contains corresponding elements. A sealing ring is interposed between the annular internal end surfaces to prevent the liquid phase from penetrating into the connection. Male metal sealing surfaces are provided between the treaded portion and the bearing surface. A clearance is provided between the external peripheral surface of the nose and the facing internal reinforcing peripheral surface on the female part.

22 Claims, 7 Drawing Sheets

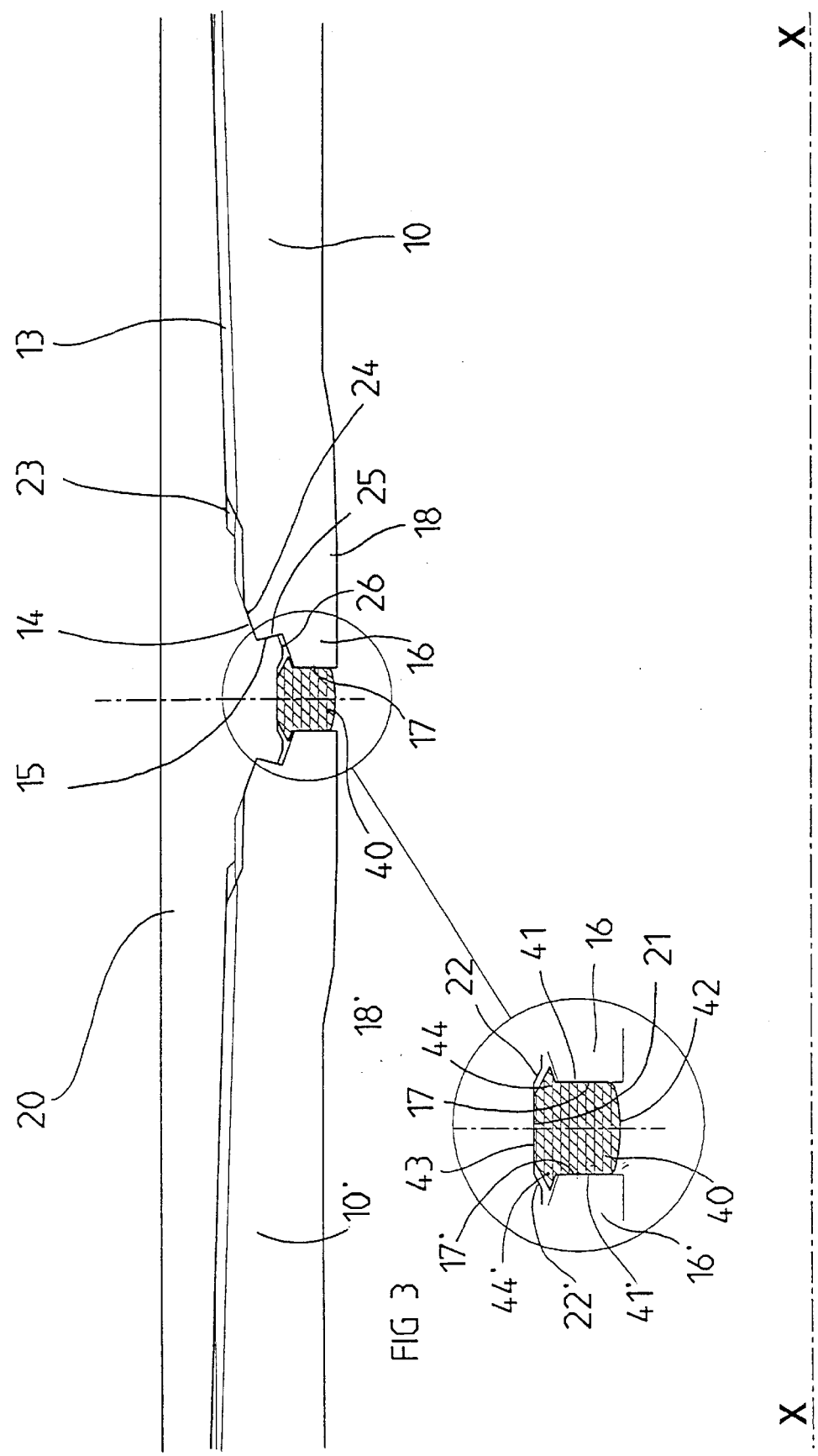

THREADED ASSEMBLY OF METAL TUBES DESIGNED TO CONTAIN A CORROSIVE FLUID

BACKGROUND OF THE INVENTION

1. Field of the Invention

The present invention relates to a threaded connection between two metal pipes which may or may not be provided with an internal coating and is more particularly intended to contain a corrosive fluid.

2. Discussion of the Background

Threaded connections for metal pipe are already known for use in oil or gas wells such as production tubing to raise oil or gas to the surface, or as casing pipe to hold the ground around a well.

Such threaded connections are generally of two types:
a) integral, namely the end of a first pipe comprises a male connecting element and the end of a second pipe to be connected comprises a female connecting element.
b) coupled, namely the ends of the pipes to be connected each comprise a male connecting element, each end being screwed to a short coupling comprising a female connecting element at each end.

French patent FR-A-1 489 013 describes an integral threaded connection with trapezoidal threads, the end of the male element having a concave conical shape which, at the end of the connection makeup, bears against a convex conical shoulder located at the base of the thread of the female element; further, the outer terminal edge of the male element is slightly chamfered and comes into mating contact against a corresponding concave truncated conical portion on the female element thus ensuring an excellent gas seal even after several successive uses of the connecting elements.

That patent also describes an option in which a connection for pipes is coated internally with a layer of enamel or epoxy resin when the fluid circulating in the pipes is aggressive or corrosive as regards the metal of the pipes.

Internally coated pipes may also be required when the fluid circulating in the pipes comprises water with chlorides and/or dissolved oxygen or $CO_2$ and is thus highly corrosive towards the metal used.

In order to prevent any penetration of aggressive fluid into the shoulder, FR-A-1 489 013 proposes a housing on the inside of the male end for a complementary sealing ring which bears both on the coated zones of the male end and on the shoulder which is continuous with the internal coating of the pipes.

European patent application EP-A-0 759 497 describes a threaded connection which is intended for a water injection well to improve recovery of hydrocarbons from an oil field; the water injected into such a well is usually an oxygenated brine which is extremely corrosive.

EP-A-0 759 497 describes a threaded and coupled (T & C) connection, the coupling comprising internally, to either side of a protruding central portion, an annular shoulder followed by a female thread, the pipes comprising externally, moving towards their ends, a thread followed by an annular transverse bearing surface which is complementary to the shoulder of the coupling and finally a smooth zone terminated by an annular radial surface.

A sealing ring of soft synthetic material is interposed between the ends of the pipes and is compressed by the ends of the pipe, the position of which at the end of the connection makeup being determined by the thrust of the bearing surfaces of the pipes on the corresponding surfaces on the coupling. The internal surface and the annular end surfaces of the pipe are coated with a synthetic resin such that penetration of corrosive liquid into the metal parts of the connection is prevented by the compressed ring.

EP-A-0 759 497 also describes solutions for integrally threaded connections derived directly from the solution described for the T & C connection, the bearing surface in this case being moved to the free end of the female element.

Such a connection with a sealing ring of soft synthetic material cannot be completely tight, in particular gas tight, as the contact pressure exerted by the soft material ring is much lower than that resulting from elastic deformation of a metal on a metal as described in FR-A-1 489 013.

SUMMARY OF THE INVENTION

The present invention seeks to provide an extremely reliable and tight threaded connection for metal pipes, more particularly those intended to contain a corrosive fluid.

The threaded connection has to preserve a good seal and good resistance against mechanical stress despite several makeup/break-out cycles, as the metal pipes must be able to be detached then re-attached to others a number of times.

The threaded connection must also be capable of being in the form of an integral connection and as a T & C connection and in that case, must use couplings which are relatively economical to produce.

Further, the threaded connection must be capable of being made:
between two pipes of a metal which is resistant to corrosion by the fluid contained in them;
and between two pipes of a metal which is not resistant to corrosion but is provided with an internal coating which is inert to the corrosive fluid;
and between a pipe of a metal which is resistant to corrosion and a pipe provided with an internal coating.

Clearly, using an internal coating enables a less precious (and therefore cheaper) metal to be used.

When internally coated pipes are used, we have sought to produce a connection which is compatible both with thin coatings a few hundredths of mm thick and with coatings in the form of tubes with a thickness of the order of a few mm which internally line the main pipes and which are affixed thereto, the constituent materials of these internal lining tubes possibly being relatively brittle.

In a first aspect, the invention provides an integral threaded connection between two metal pipes, in particular pipes intended to contain a corrosive fluid, of the type comprising a male element externally formed at the end of a first pipe of the connection and a female element internally formed at the end of a second pipe.

The male element comprises a male threaded portion and a male non threaded portion, the latter being located at the free end side of the male element.

The female element comprises a female threaded portion and a female non threaded portion on the side opposite the free end of the female element.

The male or female threaded portions can, for example, be a conical thread or a combination of two cylindrical two-stage threads in known manner. The male threaded portion of the male element is screwed into the female threaded portion of the female element and the non threaded portion of the male element co-operates with that of the female portion.

The male non threaded portion of the male element comprises, moving towards the free end of that element:
an annular transverse bearing surface formed over a fraction of the pipe thickness;

the external peripheral surface of a nose with a reduced external diameter;

an annular radial surface which joins the internal peripheral surface of the first pipe.

Said annular radial surface will be termed the annular internal end surface of the first pipe in the remainder of the present document.

The female non threaded portion of the female element comprises, moving towards the side opposite the free end of said element:

an annular transverse bearing surface forming a shoulder which is complementary to the bearing surface of the male element, the internal peripheral surface of a zone termed a reinforcing zone;

an internal peripheral housing surface for a sealing ring;

an annular radial surface which joins the internal peripheral surface of the second pipe.

This annular radial surface is termed the annular internal end surface of the second pipe in the remainder of the present document.

The bearing surface of the male element abuts against the bearing surface of the female element.

The annular internal end surfaces of the two pipes are located facing each other and at a distance from each other.

The term "radial" for the annular internal end surfaces of the pipes indicates in the present document that these surfaces are orientated perpendicular or almost perpendicular to the connection axis.

A sealing ring of synthetic material is directly or indirectly interposed between the annular internal end surfaces of the two pipes and provides a first sealing means against the fluid contained inside the pipes, the sealing ring being directly or indirectly axially compressed by the annular internal end surfaces of the two pipes.

The sealing ring is, of course, formed from a material which is inert towards the fluid contained in the connected pipes.

Each of the non threaded portions of the male and female elements of the connection also comprises an annular metal sealing surface located between the threaded portion and the bearing surface, the male metal sealing surface and the male element bearing on the female metal sealing surface of the female element with a positive diametral interference.

In the present document, the term "diametral interference" between conjugate points of the two surfaces of revolution which radially interfere means the algebraic difference in diameter measured before makeup between a reference point on the male surface and the corresponding point of contact on the female surface, the value of the contact pressure between the male and female metal sealing surfaces being a direct function of the value of the diametral interference.

Further, a clearance is maintained between the external peripheral surface of the nose of the male element and the facing peripheral surface of the reinforcing zone on the female element.

Thus the present invention solves the problem of producing a highly tight integral threaded connection using two successive sealing means, suitably located and each having their own function the sealing ring which is subjected to a moderate contact pressure can confine corrosive phases of the fluid while the sealing surfaces which are subjected to very high contact pressures endow the connection with its overall tightness.

The relatively large thickness of the pipes in the area of the sealing surfaces means that very high contact pressures can be developed.

The clearance maintained between the external peripheral surface of the nose and the internal peripheral surface of the reinforcing zone prevents the contact pressure between the sealing surfaces from being released.

The interposition of the bearing surfaces abutting between the sealing surfaces and the sealing ring further reduces any risks of corrosion.

The invention also provides a T & C connection between two metal pipes, in particular pipes intended to contain a corrosive fluid, of the type comprising a male element externally formed at the end of each of two pipes and a female element internally formed at each end of a coupling, the female elements being disposed back to back on the coupling.

Each male element comprises a male threaded portion and a male non threaded portion, the latter being located at the free end side of the male element under consideration.

Each female element comprises a threaded female portion and a female non threaded portion at the side opposite the free end of the female element under consideration.

The male or female threaded portions can, for example, be a conical thread or a combination of two cylindrical two-stage threads in known manner. The male threaded portion of each male element is screwed into the female threaded portion of the corresponding female element and the non threaded portion of each male element co-operates with that of the corresponding female portion.

The male non threaded portion of each male element comprises, moving towards the free end of that element:

an annular transverse bearing surface formed over a fraction of the pipe thickness;

the external peripheral surface of a nose with a reduced external diameter;

an annular radial surface which joins the internal peripheral surface of the pipe under consideration.

Said annular radial surfaces will be termed the annular internal end surfaces of the two pipes in the remainder of the present document. They are located facing each other and at a distance from each other.

The female non threaded portion of each female element of the coupling comprises, moving towards the side opposite the free end of said element:

an annular transverse bearing surface forming a shoulder which is complementary to the bearing surface of the male element;

the internal peripheral surface of a zone termed a reinforcing zone;

a housing surface for a sealing ring which surface is common with the housing surface of the other female element of the coupling.

The bearing surface of each male element abuts against the bearing surface of the corresponding female element.

A sealing ring of synthetic material is directly or indirectly interposed between the annular internal end surfaces of the two pipes and provides a first sealing means against the fluid contained inside the pipes, the sealing ring being directly or indirectly axially compressed by the annular internal end surfaces of the two pipes.

The sealing ring is, of course, formed from a material which is inert towards the fluid contained in the connected pipes.

Each of the non threaded portions of each of the male and female elements of the connection also comprises an annular metal sealing surface located between the threaded portion and the bearing surface, the male metal sealing surface of each male element bearing on the female metal sealing surface of the corresponding female element with a positive diametral interference.

Further, a clearance is maintained between the external peripheral surface of the nose of each male element and the peripheral surface of the facing reinforcing zone on the corresponding female element.

The present invention overcomes the problem of producing a highly tight T & C connection for the same reasons as those given for the integral connection.

We shall now describe preferred solutions or advantages which, unless otherwise indicated, can be used both for the integral connection and for the T & C connection of the invention.

Preferably, the external diameter and the internal diameter of the annular internal end surfaces of the two pipes are substantially identical.

Preferably, the bearing surface of the male element is a very open concave conical surface, the bearing surface of the female element being convex conical with the same vertex angle as the male bearing surface. More preferably, vertex half-angle of these bearing surfaces is in the range 70° to 85°.

Advantageously, the diameter of the internal peripheral surface of the reinforcing zone of the female element reduces with distance from the female bearing surface, which tends to mechanically strengthen the latter.

In the remainder of the present document, the abbreviation "reinforcing surface" will be used for the internal peripheral surface of the reinforcing zone of the female element.

Preferably, the angle between the bearing surface and the reinforcing surface thereof on the female element is a right angle or an obtuse angle.

Advantageously, the male and female metal sealing surfaces are conical surfaces with a vertex half-angle which is substantially identical, and the diameter reduces towards the free end of the male element.

The vertex half-angle of the male and female metal sealing surfaces is preferably in the range 2° to 30°.

To prevent the sealing ring from moving out of its housing, in particular during makeup, the external peripheral surface of the sealing ring advantageously bears against at least one cross section of the peripheral surface of the housing provided on the female element.

Advantageously again, the sealing ring can be provided with mechanical blocking means to prevent radial displacement towards the axis which can cause it to leave its housing, which would cause the corrosive phase to pass into the connection. These means can, for example, be means for fitting the sealing ring on the nose or on the end surface of the pipes.

The annular end surfaces of the pipes in contact with the sealing ring can also be endowed with a slightly convex conical shape so as to wedge the sealing ring and prevent it from displacing radially towards the axis.

In order to limit the cost of the pipes, they are preferably formed from a metal which is less resistant to corrosion by the fluid it contains and they are provided on their internal peripheral surface and on their annular internal end surface with a coating, care being taken to ensure that the coating is continuous between these two surfaces to prevent any penetration of corrosive condensate or liquid between them.

The invention is thus applicable to compound pipes each composed of a principal metal pipe which has a low resistance to corrosion and a coating provided on the internal peripheral surface and the annular internal end surface. In this case, the ring bears indirectly on the annular internal end surfaces via the coating formed thereon.

The coating can thus be a relatively thin layer of a material such as an epoxy resin, for example, applied or sprayed onto the internal peripheral surface of the pipes of the connection and onto the annular internal end surfaces thereof The coating can also be thicker.

The coating of the internal peripheral surface of the pipes can be obtained using a tube of synthetic material or a metal internally lining the main pipe and affixed thereto using suitable means such as cementing, adhering, interposition of an adhesive resin, welding, plating, etc. . .

The internal lining tubes preferably have a transverse end surface located at the same cross section as the annular internal end of the main pipe and the continuity of the coating on the annular internal end surface is ensured by means of an annular flange which is affixed by one of its faces to said annular internal end surface and to the end surface of the internal lining tube while the opposite face of the flange bears against the sealing ring.

On the male elements, the flange thus constitutes the extreme portion of a compound nose and its external peripheral surface has a clearance with respect to the internal peripheral surface of the reinforcing zone.

The sealing ring bears indirectly on the internal annular end surfaces of the pipes via flanges which are affixed to these surfaces.

Optionally, taking into account the thickness of the flange, the compound nose on the male element or elements can be solely constituted by the flange, the metallic portion of the composition nose having zero length.

Clearly, the flange must be affixed to the end of the lining tube in such a manner as to prevent passage of the liquid phase between these two parts; it can be affixed, for example, by adhering or any other equivalent means.

Preferably again, the internal lining tube is affixed to the main pipe by a relatively thick layer of a bonding material which adheres both to the main pipe and to the internal lining tube. The term "relatively thick bonding layer" as used here means a layer with a thickness of the order of one or a few mm. Such a layer can absorb geometrical irregularities on the internal surface of the pipes such as those resulting from tapering the end of the main pipe.

Advantageously in this case, the face of the flange facing the annular internal end surface of the pipe comprises a protruding anchoring means co-operating with a means of complementary shape in the end surface of the bonding layer.

The flange can also be extended at a right angle on its internal diameter side by a collar which is affixed via its peripheral external surface with the internal peripheral surface of the internal lining tube.

Clearly, the collar of the internal lining tube must be affixed in such a manner as to prevent the passage of a liquid phase between these two parts; here again, they can be affixed by adhering or by any other equivalent means.

Very advantageously, the flange is formed from the same material as the internal lining tube, thus facilitating joining and avoiding subjecting the joint to stresses when the connection is hot.

As an example, the material of the internal lining can be a glass fiber reinforced epoxy resin.

Advantageously again, the surface of the annular flange bearing on the sealing ring is a very slightly convex conical surface. It has been observed that such a disposition reduces the risk of cracking the flange when the flange is formed from a relatively brittle material.

For a T & C connection which would require a sealing ring with too large a diameter which would risk buckling during compression, the sealing ring can be replaced by an equivalent sealing means constituted by a deformable ring of synthetic material located co-axially either side of a central ring of relatively hard material with respect to that of the deformable rings and not sensitive to corrosion by the fluid contained inside. One side of each of the two deformable rings bears on an annular internal end surface of the coated or uncoated pipe, and the other side bears on an end face of the central ring.

Advantageously, the external peripheral surfaces of the deformable rings bear against a housing in the internal periphery of the coupling.

BRIEF DESCRIPTION OF THE DRAWINGS

The accompanying figures relate to non limiting examples of particular embodiments of the invention which will now be described in detail.

FIG. 2 shows a detailed cross section of the connection of the invention, the pipes in FIG. 1 having been connected.

FIG. 3 shows a detail of the sealing ring of FIG. 2.

DETAILED DESCRIPTION OF THE PREFERRED EMBODIMENTS

Figure 1:
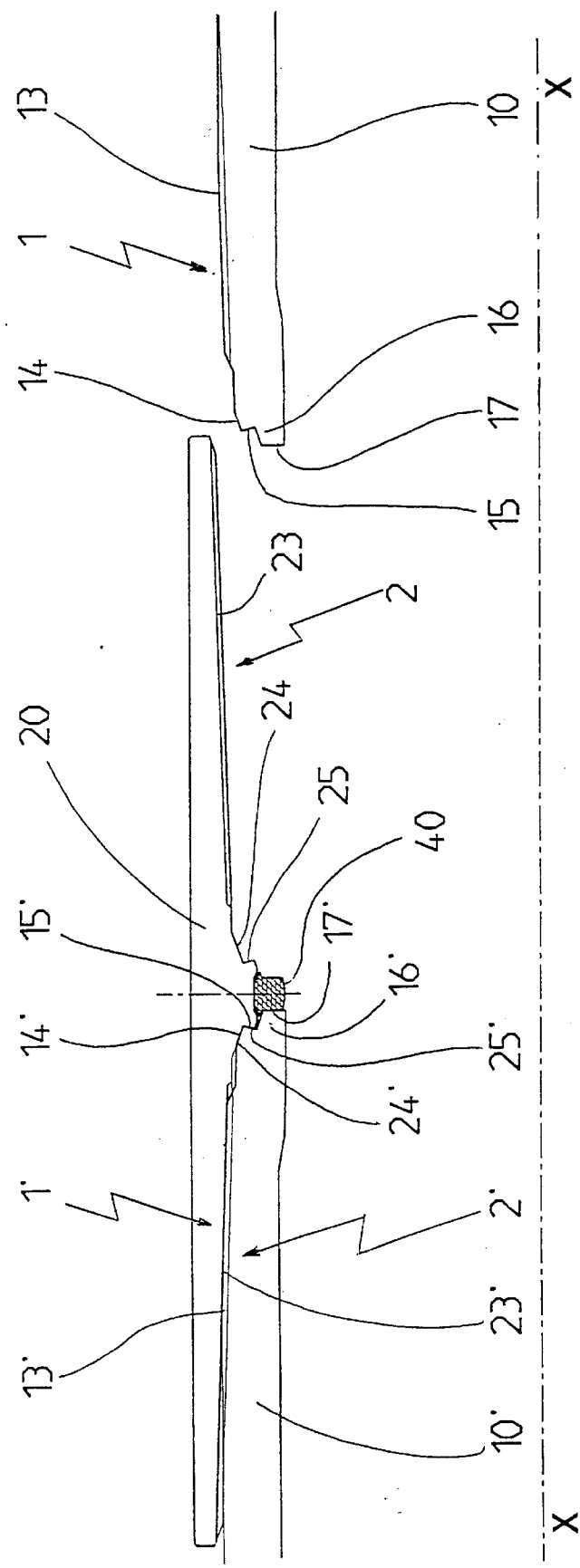
FIG. 1 shows a general view in longitudinal section of two pipes which constitute a T & C connection of the invention.

FIG. 1 shows two metal pipes 10, 10' which are to be screwed together using a coupling 20 which has already been attached to pipe 10'.

Pipe 10 will be termed the first pipe of the connection and pipe 10' will be termed the second pipe of the connection.

Outside the facing ends of pipes 10, 10' is a male element 1, 1', element 1' being symmetrical to element 1.

Inside each of the two ends of coupling 20 is a female element 2, 2', these female elements being identical but symmetrical with respect to the transverse median of the coupling.

Because of the symmetry of the connection, the connection of pipe 10 to coupling 20 by co-operating elements 1, 2 will be described, pipe 10' being connected in similar manner to coupling 20 by co-operating elements 1', 2'.

Metal pipes 10 and 10' are, for example, production tubing or casing pipe for oil or gas wells assembled in a string and intended to contain and circulate corrosive fluids such as hydrocarbons containing moist $CO_2$ or mixtures of hydrocarbons, water and chlorides (brine).

Depending on the nature of the corrosive fluid, these pipes 10, 10' are thus produced from martensitic stainless steel, from austenitic-ferritic stainless steel containing 22% Cr, or from a nickel alloy containing 28% Cr.

Moving towards the free end 17, the exterior of male element 1 of the connection comprises a male conical thread 13 with trapezoidal threads followed by a non threaded portion comprising an annular metal sealing surface 14, an annular transverse bearing surface 15 and extending beyond this by the external peripheral surface of a nose 16.

The male annular metal sealing surface 14 is a conical surface the diameter of which reduces towards the free end 17 of pipe 10; the vertex half-angle is 200. Other values can be used for the vertex half-angle, from as low as 2° to as high as 30° to ensure a gas seal.

The annular transverse bearing surface 15 is a very open concave conical surface with a vertex half-angle of 75° which is machined over only a fraction of its thickness, the height of that bearing surface being adapted to the makeup torque of the connection.

The thickness of nose 16 beyond bearing surface 15 is relatively small because of the reduction in thickness caused by the transverse bearing surface.

The external peripheral surface of nose 16 is a conical surface with a diameter which reduces towards the free end 17 and which has a vertex half-angle of 20°.

Nose 16 terminates in annular surface 17 which is radially oriented, i.e., perpendicular or substantially perpendicular to the axis X—X of the connection.

Pipe 10' is terminated on the side of its internal periphery by an annular radial surface 17' facing the annular radial surface 17 of pipe 10.

Annular surfaces 17 and 17' have the same radial thickness and are termed "annular internal end surface of the pipes".

The internal peripheral surface of female element 2 comprises means corresponding to the means on the male element which can co-operate with the latter.

From the free end of coupling 20, the female element 2 comprises:
  a female thread 23 of the same type as that on the male element and with complementary threads;
  a conical sealing surface 24 with a taper which corresponds in slope and direction to that of the male element;
  a convex conical bearing surface 25, the height, taper and direction of which corresponds to that (15) of the male element;
  a conical reinforcing surface 26 the diameter of which reduces with distance from the bearing surface and for which the vertex half-angle is 20°, as is the external peripheral surface of nose 16;
  and finally, a housing (21, 22, 22') for a sealing ring 40 located in a slight hollow on the internal periphery of coupling 20 and substantially in the middle thereof It should be noted that the female conical reinforcing surface 26 forms an angle of 95° with respect to the conical abutment surface 25. It transpires, surprisingly, that such a configuration can enable a large makeup torque to be produced in the bearing surfaces 15, 25, despite the relatively low height thereof Sealing ring 40, shown in more detail in FIG. 3, is formed from a deformable synthetic material which is inert to the contained fluid.

It comprises two end faces 41, 41' terminated externally by an edge 44, 44', an internal peripheral surface 42 and an external peripheral surface 43.

The external peripheral surface 43 of ring 40 is convex and constituted by a cylindrical surface surrounded by two conical surfaces which externally delimit the edges 44, 44'.

The central cylindrical surface bears on the central cylindrical portion of housing 21 to prevent any radial displacement of ring 40 during makeup.

In contrast, there is a clearance between the external conical surfaces of edges 44, 44' of ring 40 and edges 22, 22' of housing 21, which edges are also conical. This clearance is axially of the order of a mm and either enables ring 40 to be introduced once coupling 20 is connected to pipe 10', or it enables pipe 10' to be screwed onto coupling 20 into which ring 40 has already been introduced without that ring leaving its housing.

End faces 41 and 41' of ring 40 are planar surfaces which are substantially perpendicular to the axis of the connection.

End face 41' directed towards pipe 10' bears axially directly on the annular internal end surface 17' of pipe 10'.

End face 41 directed towards pipe 10 faces the annular internal end surface 17 of pipe 10.

The role of edges 44, 44' will be studied below for the made-up connection.

The diameter of internal peripheral surface 42 before makeup is larger than that of the ends of pipes 10 and 10'. The value of this difference will be indicated below for the made-up connection.

FIG. 2 shows the same elements as FIG. 1 at the end of the connection makeup.

At a particular moment when screwing male element 1 into female element 2, the annular end surface 17 comes into contact with deformable sealing ring 40. On continuing screwing, ring 40 is axially compressed between the annular internal end surfaces 17 and 17' which prevents subsequent penetration of the liquid phase of a corrosive fluid contained inside into the connection.

At this stage of screwing, such a connection would not, however, be perfectly gas tight against high pressure gases or gaseous phases.

On continuing screwing, firstly the metal sealing surfaces 14 and 24 come into contact then set up an elastic contact pressure between them and finally, the bearing surface 15 contacts bearing surface 25 which results in a sharp increase in the makeup torque.

The contact pressure between the metal sealing surfaces 14 and 24 is determined by the value of the diametral interference obtained for a given geometry, in particular for a given taper of surfaces 14, 24 and for a given metal thickness.

The contact pressure at metal surfaces 14 and 24 cannot, however, exceed the yield stress of the metal of elements 1 and 2, as exceeding that limit would risk seizing the metal surfaces 14 and 24 and modifying the characteristics and function of the connection after subsequent break-out and re-makeup.

In order to avoid all contact between the external peripheral surface of nose 16 and the facing internal reinforcing surface 26 on female element 2, which contact could reduce the value of the diametral interference between the metal sealing surfaces 14 and 24, the external peripheral surface of nose 16 is a conical surface with an angle of 20°, as is the facing conical reinforcing surface 26 on female element 2. Further, the height of the female bearing surface 25 is slightly lower than that of male bearing surface 15, producing a clearance of at least 0.1 mm at any time during and at the end of makeup between the internal peripheral reinforcing surface 26 of female element 2 and the external peripheral surface of nose 16.

The axial length of nose 16 is a function of the geometry of the connection, in particular the axial thickness of the sealing ring 40 and the distance between bearing surfaces 25, 25' of coupling 20.

A short nose means that zone 26 is narrow and may require a sealing ring 40 which is relatively wide axially with respect to its radial thickness. The ratio of the width of sealing ring 40 to its thickness is intended to be 1.5 or less, if possible close to 1, as a high width/thickness ratio would risk buckling ring 40.

We shall see below that when constituting a compound nose, the metallic portion 16 of the compound nose can optionally be of zero length.

Too long a nose 16 means that the annular internal end surface 17 would not be thick enough, taking into account the taper of the external surface.

Further, the end of pipes 10, 10' must often be plastically deformed such that the metal is displaced at 18, 18' where we need it, i.e., somewhat towards the internal diameter of the pipes. Such an operation, known as tapering, is well known to the skilled person.

Sealing ring 40 is formed from a composite material constituted by a PTFE matrix reinforced with 25% glass fibers. A material containing a smaller proportion of glass fibers can be used but this reduces the elastic modulus of the material and ring 40 has to be deformed further to obtain the same contact pressure.

For a 25% glass fiber reinforcement with an elastic modulus of the order of 800 MPa, sealing ring 40 has to be compressed by 10% to 25% when the connection is made-up depending on the dimensions, which ensures a contact pressure of 80 to about 200 MPa on the end faces 41, 41' of ring 40.

After makeup, the diameter of internal peripheral surface 42 of sealing ring 40 must not be substantially smaller than that of the ends of pipes 10, 10' otherwise the sealing ring would project internally and risk obstructing tools moving inside the pipes. Thus the initial diameter of ring 40 is calculated from the diameter after makeup by considering the axially compressed volume to be equal to that deformed radially over the diameter, ring 40 being externally blocked in housing 21.

Ring 40 being unable to form a perfect gas seal, in a steady state there is at the outer periphery of ring 40 a gas pressure which is close to that of the fluid, because of the metal sealing surfaces 14, 24, 14', 24'. When the fluid is rapidly depressurised, the counter-pressure on the external periphery 43 of ring 40 becomes higher than that of the fluid at its internal periphery 42 and forces the ring to leave its housing and thus places a corrosive liquid phase in contact with the metal of the connection.

External edges 44, 44' at the end of end surfaces 41, 41' of ring 40 overlap the end of nose 16, 16' and fit the deformable ring on the end of nose 16 and 16', preventing any accidental displacement towards the axis of the sealing ring 40.

A further means (not shown) for preventing radial displacement of ring 40 towards the axis is to slightly incline the annular end surfaces 17 and 17' to give the surfaces a slightly convex conical shape with a vertex half-angle of slightly less than 90° so that the annular radial surfaces wedge the deformable ring 40 and prevent it from displacing radially towards the axis. A matching conical shape is thus given to the faces of ends 41, 41 ' of sealing ring 40.

Figure 4:
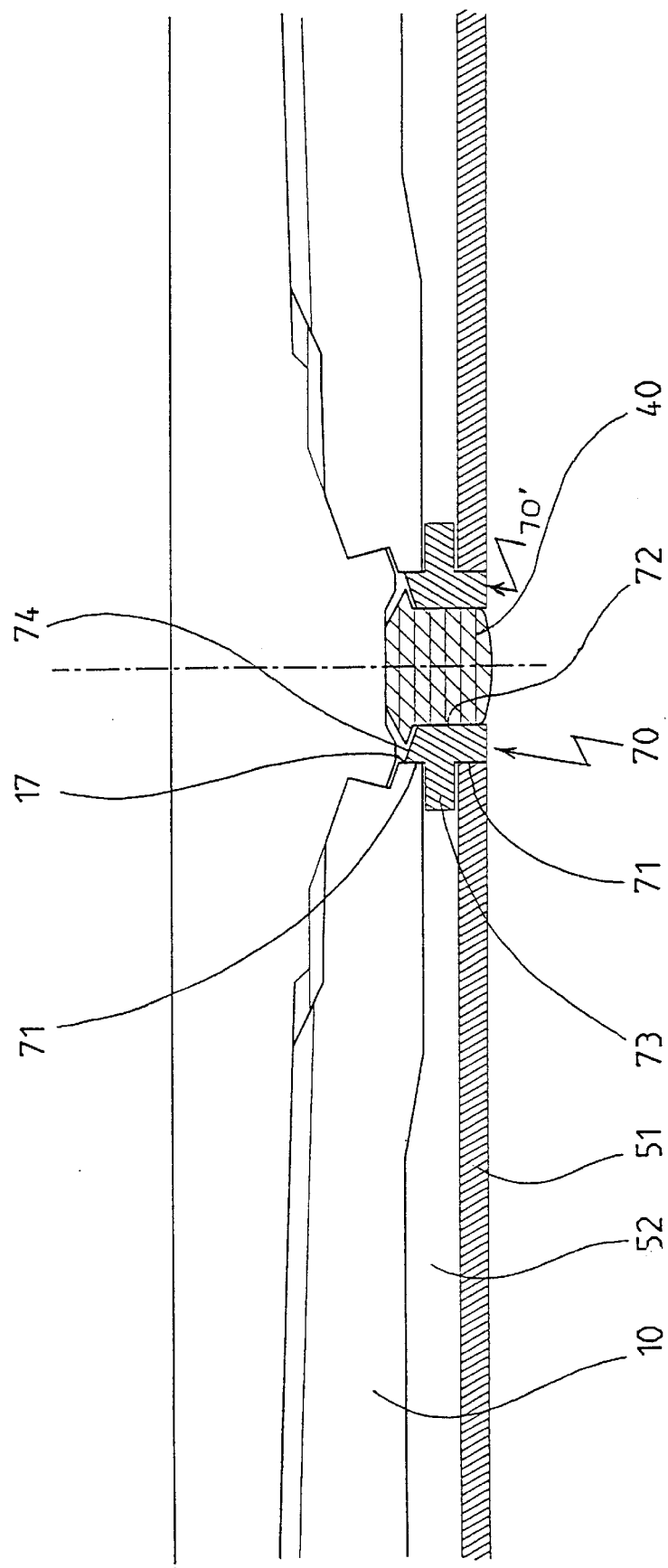
FIG. 4 shows a longitudinal cross section of the central portion of a T & C connection of the invention, the connection pipes being provided with internal lining tubes.

FIG. 4 shows a connection of the invention of metal pipes 10 and 10' in low alloy steel internally lined with tubes 51, 51' with a thickness of the order of 2 to 3 mm.

These internal lining tubes are, for example, formed from glass fiber reinforced epoxy resin. Such a composite material is particularly suitable when the fluid contained inside is extremely corrosive. An example is a hot mixture, at over 100° C., of natural gas, $CO_2$ and brine (=$H_2O$+chlorides) also containing abrasive sand particles, the fluid pressure being over 10 MPa.

Glass fiber filled epoxy resin is a material which is also resistant to shocks caused by tools which move inside the pipes, but this material cannot be shaped by plastic deformation.

In order to affix internal lining tube 51 to the main pipe 10, a cement or synthetic resin is used in the form of a relatively thick bonding layer 52 which adheres both to the main pipe 10 and to the internal lining tube 51. U.S. Pat. No. 3,482,007 describes an example of such an affixing process by cementing.

It should be noted that a sufficiently thick bonding layer 52 can absorb the geometrical discontinuity 18 resulting from tapering the end of main pipe 10.

Internal lining tube 51 is preferably cut at the same cross-section as the annular internal end 17 of pipe 10; the presence of a nose 16 with sufficient length so that the cut surface is located beyond the vertex of the bearing surface can facilitate the cutting operation.

In order to ensure continuity of the coating on the annular internal end surfaces 17, 17', an annular flange 70, 70' is embedded in and affixed to the end of lined pipes/tubes 10+51, 10'+51'.

Each flange 70. 70' thus constitutes the extreme portion of a compound nose with metallic nose 16, 16', and sealing ring 40 bears indirectly on the internal annular end surfaces 17, 17' of the tubes via flanges 70, 70' which are affixed to these surfaces.

Since the two flanges 70, 70' are identical and mounted symmetrically, only flange 70 will be described.

This has an annular shape disposed radially with respect to the connection.

One face 71 is adhered to the annular internal end surface 17 and to the end of internal lining tube 51, the adhesive preventing penetration of the liquid phase between the internal lining tube 51 and the main pipe 10.

Face 71 comprises an annular projection 73 which is fitted in a groove with a complementary shape formed at the end of the bonding layer 52.

The combination of this projection 73 and this groove anchors the flange on the end surface of the lined pipe.

The other face 72 of flange 70 bears on sealing ring 40.

Flange 70 is formed, as is the internal lining tube, of glass fiber reinforced epoxy resin. Such a material is harder than the material of sealing ring 40, enabling the contact pressure provided by nose 16 to be transmitted properly.

The internal peripheral surface of flange 70 is a cylindrical surface located in the extension of the internal peripheral surface of internal lining tube 51. Such a disposition ensures that the cross section of flow is constant all along the pipe string.

External peripheral surface 74 of flange 70 is a conical surface located substantially in the extension of the external peripheral surface of nose 16, to enable edge 44 of sealing ring 40 to overlap surface 74.

Figure 5:
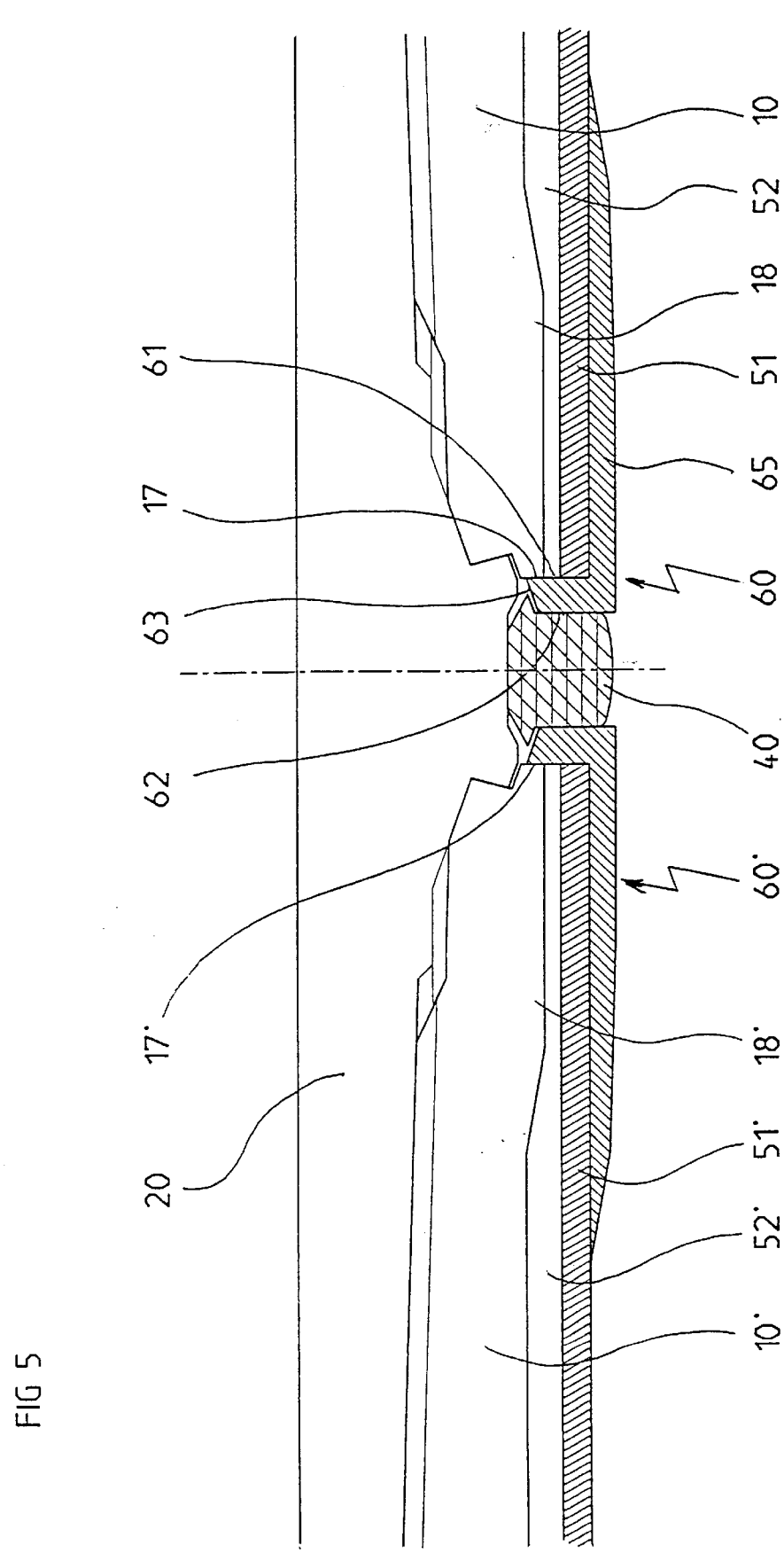
FIG. 5 shows a variation of the threaded connection of FIG. 4.

FIG. 5 shows a variation of FIG. 4, flange 60 not comprising an annular projection on its face 61 but being extended at a right angle on the side of its internal diameter by a collar 65 the external peripheral surface of which is affixed to the internal peripheral surface of internal lining tube 51 by adhesion.

Here again, each flange 60, 60' constitutes the extreme portion of a compound nose and sealing ring 40 bears indirectly on the internal annular end surfaces 17, 17' of the pipes via flanges 60, 60' which are affixed to these surfaces.

Flange 60 and collar 65 are sufficiently thick to resist mechanical stresses.

The thickness of collar 65 is limited, however, so as not to risk obstructing or being impacted by tools which move in the pipes during service: a thickness of the order of 2 to 3 mm for collar 65 is perfectly adequate.

Again to avoid obstructing and impact by tools moving in the pipes during service, the internal peripheral surface of collar 65 tends to run into the internal peripheral surface of internal lining tube 51.

Figure 8:
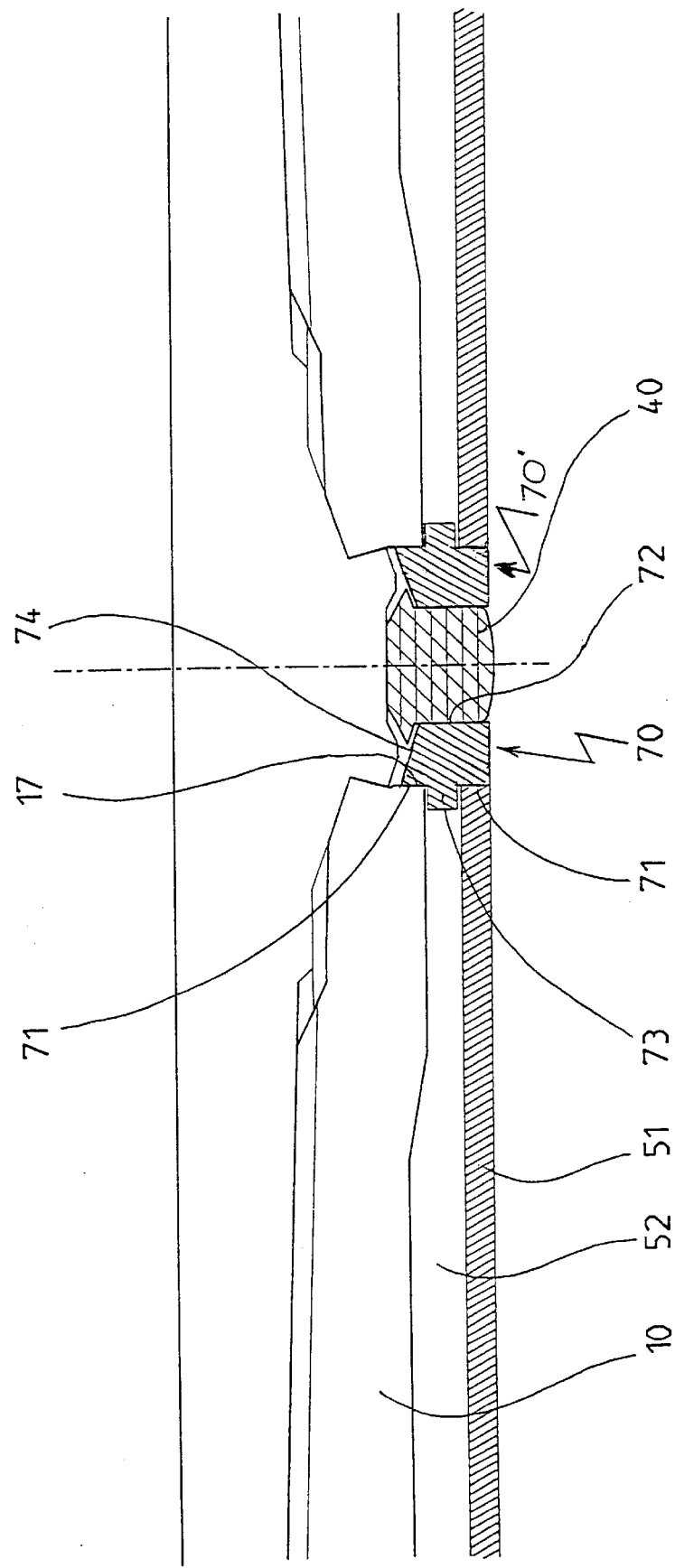
FIG. 8 shows a variation of the treaded connection of FIG. 4.

In a variation shown in FIG. 8, the compound nose on the male elements is constituted solely by flange 70, 70', the metallic portion 16, 16' of the compound nose having a zero length and the internal annular end surface 17, 17' of the pipes being located at the foot of the male bearing surfaces 15, 15'.

The clearance between the external peripheral surface of the annular flanges with respect to the inner peripheral surface of reinforcing zone 26, 26' prevents any contact pressure from being released between the sealing surfaces 14, 24 and the flanges 70, 70' from freeing themselves from the principal pipes.

It should also be noted that a slightly concave conical shape for ring bearing surface 62 or 72 will cause an over-increase in stress on critical portions of flange 60 or 70, and thus risk cracking the latter. While this is not shown in FIGS. 4 or 5, a convex conical shape with a vertex half-angle of about 85° could advantageously be used for bearing surfaces 62 or 72 of flange 60 or 70.

Although it is not shown, a metal corrosion-resistant internal lining tube affixed by plating, co-lamination, or co-extrusion with the main low alloy pipe can also be used. The continuity of the coating on the annular internal end surfaces 17 of the main pipes can thus be ensured by an adhered flange such as 60 or 70.

The internal lining tube can also be formed from a synthetic material with sufficient ductility to enable the end of the internal lining tube to be beaded at a right angle to constitute a flange covering the annular internal end surface of the pipe without risking cracking in the deformed zones. Such highly deformable internal lining tubes can in particular be formed from a thermoplastic synthetic material.

Figure 6:
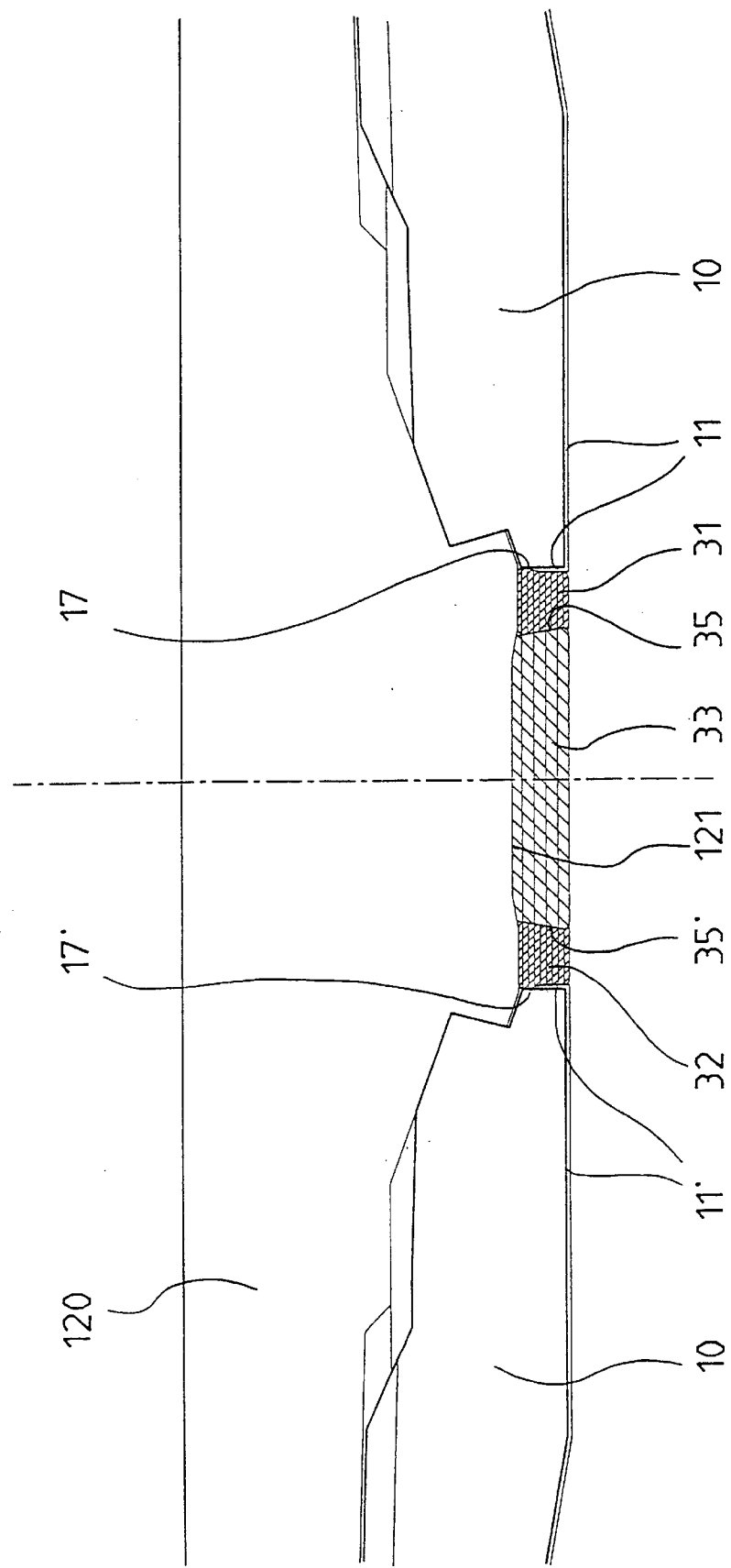
FIG. 6 shows a longitudinal cross section of the central portion of a T & C connection of the invention with pipes coated internally with a layer of a sprayed coating, the sealing ring being replaced by an equivalent sealing means.

FIG. 6 shows a T & C connection which would require a deformable ring which was too wide in an axial direction, the coating of the internal peripheral surface and the annular internal end surfaces 17, 17' of pipes 10, 10' being a thin sprayed layer with a thickness of about 0.04 mm of an epoxy type synthetic material.

In this case, the sealing ring is replaced by an equivalent sealing means constituted by deformable rings 31, 32 located either side of a central ring 33 of relatively hard material with respect to that of rings 31, 32 such as a glass fiber reinforced epoxy resin, deformable rings 31, 32 being of PTFE reinforced with 25% glass fibers.

Deformable rings 31, 32 can, for example, be adhered to end surfaces 35, 35' of central ring 33.

The internal peripheral surface of central ring 33 is located in the extension of the coated internal peripheral surface of pipes 10 and 10'.

The end surfaces 35, 35' of central ring 33 can be slightly convex truncated conical surfaces with a vertex half-angle of 80°, for example, to wedge deformable rings 31, 32 and prevent them from leaving their housing.

Such a wedging effect can be completed also by inclining the annular end surfaces 17, 17' of pipes 10, 10' giving them a slightly convex truncated conical shape.

As in the preceding figures, the external periphery of sealing rings 31, 32 bear on the internal peripheral surface of coupling 120 and after makeup, their internal diameter is at least equal to that of the internal peripheral surface of pipes 10, 10'.

Figure 7:
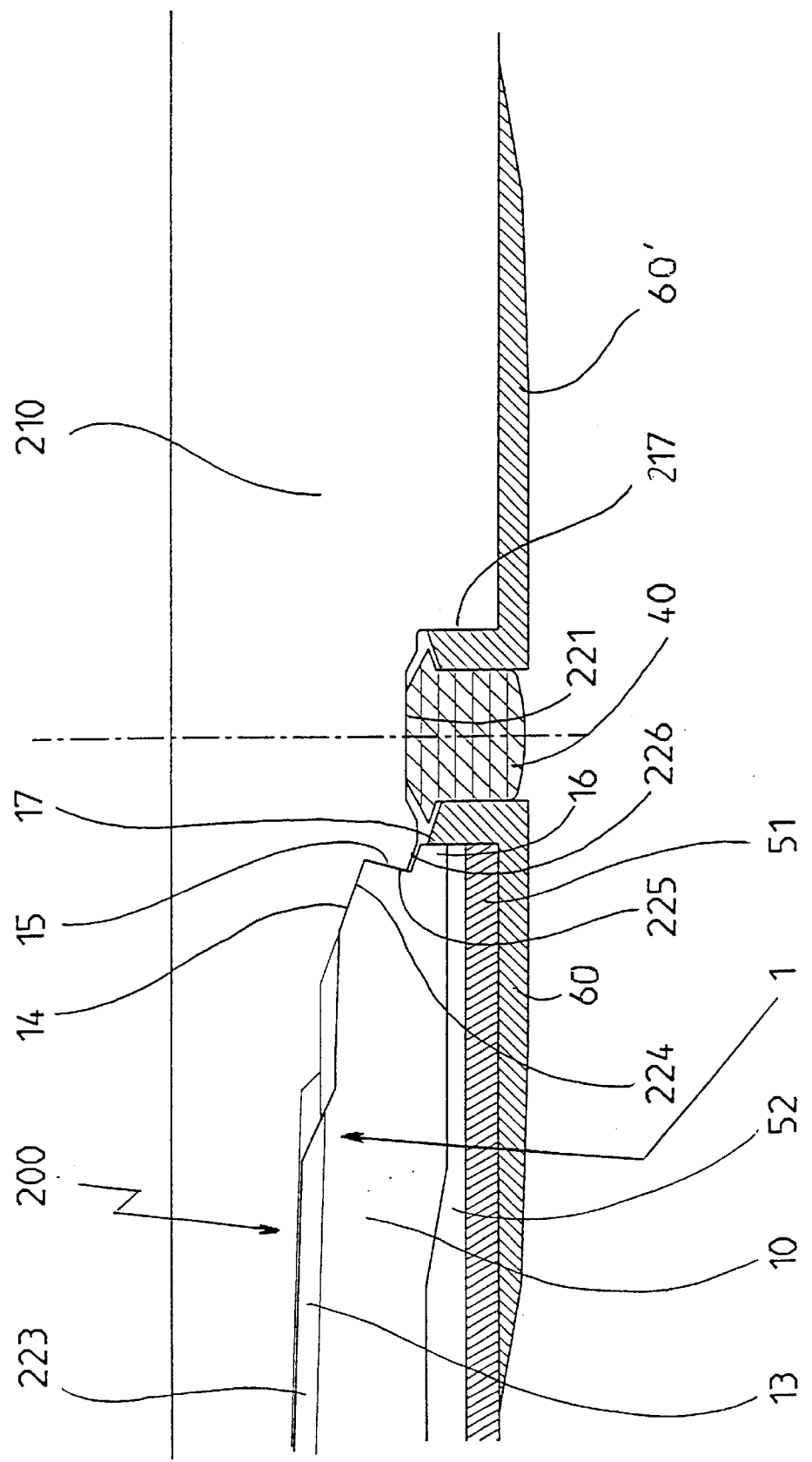
FIG. 7 shows, again in longitudinal cross section, the central portion of an integral threaded connection of the invention, only the pipe corresponding to the male element being provided with an internal lining tube.

FIG. 7 represents an integral threaded connection between a first pipe of low alloy steel internally lined with an epoxy-glass fiber pipe 51 and a thick accessory 210 of an alloy which is resistant to corrosion by a fluid contained inside, such as a stainless steel or a precipitation hardened nickel alloy.

Such thick accessories, into which integral joints can be cut, are usually found at the bottom of a hydrocarbon well.

Male threaded element 1 is similar to that of FIG. 5. Female threaded element 200 is directly formed at the end of pipe 210 on its internal periphery and comprises the same female means 221, 223, 224, 225, 226 disposed in the same manner as female means 21, 23, 24, 25, 26 of female element 2 of FIGS. 1 to 5.

Female element 200 comprises a thread 223 at the pipe end side 210 and a non threaded portion which comprises, in succession from thread 223, a metal sealing surface 224, an annular transverse bearing surface 225, a conical reinforcing surface 226, a housing 221 for a sealing ring 40 and an annular radial surface 217, the internal end.

The annular internal end surface 217 formed at the end of female element 200 joins the internal peripheral surface of the body of metal pipe 210.

As in FIG. 5, the continuity of the internal coating of pipe 10 is ensured by the collared flange 60 adhered to internal lining tube 51 and to the annular internal end surface 17 of pipe 10.

By symmetry, a flange 60' identical to flange 60 is adhered against the internal peripheral surface of tubular accessory 210 and against annular internal end surface 217.

It is also possible to dispose of flange 60', pipe 210 thus being thicker to recover the space liberated by flange 60' and its collar 65'.

The internal end surfaces 17, 217 of principal pipes 10, 210 are still facing each other but they have different internal diameters because of the presence of coating 51.

A sealing ring 40 of glass fiber filled PTFE is interposed between flanges 60, 60' and prevents the corrosive liquid phase from penetrating into the connection.

Sealing ring 40 bears indirectly on the internal annular end surfaces 17, 217 of the pipes via flanges 60, 60' which are affixed to these surfaces.

The following example describes the performances obtained of a T & C connection in a given configuration corresponding to FIG. 5.

casing string with a 7" (177.8 mm) external diameter and a mass per unit length of 29 lb/ft (43.2 kg/m) corresponding to a thickness of metal pipes to be connected of 10.36 mm of API L80 grade (low alloy steel with a minimum yield stress of 551 MPa);

conical thread (taper over diameter =1/16) with trapezoidal threads (5 threads per inch);

metal sealing surfaces inclined at 20° to the axis;

conical bearing surfaces with a vertex half-angle of 75° and height 2.5 mm;

nose at pipe ends 4 mm long inclined externally at 20° with respect to the axis;

internal lining tubes 2.5 mm thick of epoxy resin-glass fiber composite cemented to the metal pipes;

2.5 mm thick flange of epoxy resin-glass fiber composite with a collar of the same thickness, 2.5 mm;

ring of PTFE filled with 25% glass fibers, with an initial axial width of 9.5 mm and initial radial thickness of 7.6 mm, deformed by 15% after makeup;

the makeup torque applied at the end of makeup was 12750 N.m.

The following tests were carried out:

makeup/break-out 5 times in succession;

behaviour with internal water pressure in accordance with specification API 5CT;

behaviour with internal gas pressure (same pressure as above with water);

first stress combination:
 35 MPa of internal water pressure;
 +330 MPa tension (60% of minimum yield stress of L80)
 +bending at a bending angle of 10°/30 m
 +instantaneous depressurisation.

second stress combination:
 35 MPa of internal gas pressure at room temperature and at 100° C.;
 +330 MPa tension (60% of minimum yield stress of L80);
 +3 alternated bending cycles with a bending angle of 10°/30 m
 +depressurisation at a 1.4 Mpa/mn rate The behaviour criterion for these tests was an electrical insulation test known as a "Holiday test" in accordance with specification NACE TM 0186 between the internal peripheral surface of the internal lining tubes and the collars and the metal pipes. This electrical insulation test (13 kV, continuous current) can detect any cracking of the internal lining tubes, the flanges and the collars associated therewith during the mechanical tests.

The structural integrity of the internal lining tubes, the flanges and the sealing rings was also checked visually after the mechanical tests. The results of the visual checks were all satisfactory.

The present invention is not limited, of course, to the examples given above but encompasses any embodiment which falls within the scope of the appended claims.

What is claimed is:

1. An integral threaded connection between two metal pipes of the type comprising a male element externally formed at the end of a first pipe and a female element internally formed at the end of a second pipe;

the male element comprising a male threaded portion and a male non threaded portion, the latter being located at the free end side of the male element;

the female element comprising a female threaded portion and a female non threaded portion, the latter being disposed on the opposite side to the free end of the female element;

the male threaded portion of the male element being screwed into the female threaded portion of the female element and the non threaded portion of the male element co-operating with said female non threaded portion;

the male non threaded portion of the male element comprising, on moving towards the free end of said male element, an annular transverse bearing surface formed over a fraction of the pipe thickness, being extended by the external peripheral surface of a nose with a reduced external diameter and terminating in an annular radial surface termed the annular internal end surface of the first pipe which joins the internal peripheral surface of said first pipe;

the female non threaded portion of the female element comprising, moving towards the side opposite the free end of said female element, an annular transverse bearing surface forming a shoulder which is complementary to the bearing surface of the male element, being extended by the internal peripheral surface of a zone termed a reinforcing zone, then by an internal peripheral surface of a housing for a sealing ring, and terminating in an annular radial surface termed the annular internal end surface of the second pipe, which joins the internal peripheral surface of the second pipe;

the bearing surface of the male element abutting against the bearing surface of the female element;

the external and internal diameters of the annular internal end surfaces of the two pipes being disposed facing each other at a distance from each other;

a sealing ring of synthetic material being directly or indirectly interposed between the annular internal end surfaces of the two pipes and being directly or indirectly axially compressed by said annular internal end surfaces;

characterized in that:
   a) each of the non threaded portions of the male and female elements of the connection comprises a metal sealing surface which is annular in shape located between the threaded portion and the bearing surface, the male metal sealing surface of the male element bearing on the female metal sealing surface of the female element with a positive diametral interference;
   b) a clearance is maintained between the external peripheral surface of the nose of the male element and the facing peripheral surface of the reinforcing zone on the female element.

2. A threaded and coupled connection between two metal pipes of the type comprising a male element externally formed at the end of each of two pipes and a female element internally formed at each end of a coupling, the female elements being oppositely disposed back to back on the coupling;

each male element comprising a male threaded portion and a male non threaded portion, the latter being located on the free end side of the male element under consideration;

each female element comprising a female threaded portion and a female non threaded portion on the opposite side to the free end of the female element under consideration;

the male threaded portion of each male element being screwed into the female threaded portion of the corresponding female element and the non threaded portion of each male element co-operating with said female non threaded portion;

the male non threaded portion of each male element comprising, on moving towards the free end of said male element, an annular transverse bearing surface formed over a fraction of the pipe thickness, being extended by the external peripheral surface of a nose with a reduced external diameter and terminating in an annular radial surface termed the annular internal end surface which joins the internal peripheral surface of the pipe under consideration;

said annular internal end surfaces being disposed facing each other and at a distance from each other;

the female non threaded portion of each female element of coupling comprising, on moving towards the side opposite the free end of said female element, an annular transverse bearing surface forming a shoulder which is complementary to the bearing surface of the corresponding male element being extended by the internal peripheral surface of a zone termed a reinforcing zone then by a housing surface for a sealing ring which is in common with the housing surface of the other female element of coupling;

the bearing surface of each male element abutting against the bearing surface of the corresponding female element;

a sealing ring of synthetic material being directly or indirectly interposed between the annular internal end surfaces of the two pipes and being axially compressed by said annular internal end surfaces;

characterized in that:
   a) each of the non threaded portions of each of the male and female elements of the connection comprises a metal sealing surface which is annular in shape located between the threaded portion and the bearing surface, the male metal sealing surface of each male element bearing on the female metal sealing surface of the corresponding female element with a positive diametral interference;
   b) a clearance is maintained between the external peripheral surface of the nose of each male element and the facing peripheral reinforcing surface on the corresponding female element.

3. A threaded connection according to claim 1 claim, characterized in that the annular internal end surfaces of the pipes have substantially identical external and internal diameters.

4. A threaded connection according to claim 1, characterized in that the bearing surface of the male element is a very open concave conical surface, the bearing surface of the female element being conical but convex at an angle corresponding to that of the bearing surface of the male element.

5. A threaded connection according to claim 1, characterized in that the diameter of the internal peripheral surface of the reinforcing zone on the female element reduces with distance from the bearing surface.

6. A threaded connection according to claim 5, characterized in that the angle between the bearing surface of the female element and the reinforcing surface of the same element is a right or an obtuse angle.

7. A threaded connection according to claim 1, characterized in that the male and female metal sealing surfaces are conical surfaces with a vertex half-angle which is substantially identical, the diameter of these surfaces reducing towards the free end of the male element.

8. A threaded connection according to claim 1, characterized in that the external peripheral surface of the sealing ring bears against at least one straight section of the peripheral surface of the housing provided on the female element.

9. A threaded connection according to claim 1, characterized in that the sealing ring comprises mechanical blocking means to prevent radial displacement of the ring towards the axis, which displacement could cause the ring to leave its housing.

10. A threaded connection according to claim 1, characterized in that the end annular surfaces of the pipes of the connection in contact with the sealing ring are slightly conical convex surfaces which wedge the sealing ring and prevent it from displacing radially towards the axis.

11. A threaded connection according to claim 1, characterized in that the internal peripheral surface and annular internal end surface of at least one of the pipes of the connection is provided with a coating, care being taken to ensure that the coating is continuous between these two surfaces.

12. A threaded connection according to claim 11, characterized in that the coating used for the internal peripheral surface of the pipe and the annular internal end surface is a layer of a synthetic coating which is sprayed or applied.

13. A threaded connection according to claim 11, characterized in that the coating on the internal peripheral surface of the pipe or pipes to be connected is constituted by an internal lining tube which is affixed to the corresponding pipe of the connection, the transverse end surface of which is disposed in the same cross-section as the annular internal end surface of said corresponding pipe of the connection and in that the continuity of the coating on said annular internal end surface is ensured by means of an annular flange, one of the faces of which is affixed to the annular internal end surface of pipe and to the end surface of the internal lining tube and the opposite face of which bears against the sealing ring, the nose of the male element being a compound nose constituted by a metallic portion and the annular flange.

14. A threaded connection according to claim 13, characterized in that the compound nose on the male element or elements is exclusively constituted by the annular flange.

15. A threaded connection according to claim 13, characterized in that the internal lining tube is affixed to the pipe of the connection by a relatively thick layer of a bonding material which adheres to the main pipe and to the internal lining tube.

16. A threaded connection according to claim 13, characterized in that the face of the flange directed towards the annular internal end surface comprises a protruding anchoring means co-operating with a means of complementary shape in the end surface of the bonding layer.

17. A threaded connection according to claim 13, characterized in that the flange is extended at a right angle on the side of its internal diameter by a collar affixed via its external peripheral surface to the internal peripheral surface of the internal lining tube.

18. A threaded connection according to claim 13, characterized in that the flanges are formed from the same type of material as the internal lining tubes.

19. A threaded connection according to claim 13, characterized in that the bearing surface for the ring on the flange is a very slightly convex conical surface.

20. A threaded and coupled connection according to claim 2, characterized in that the sealing ring is an equivalent sealing means constituted by a deformable ring disposed co-axially either side of a central ring of hard synthetic material, each of the two deformable rings bearing axially on one end face of the central ring, and on the annular radial surface of the internal end of pipes.

21. A threaded and coupled connection according to claim 20, characterized in that the deformable rings are adhered to the end faces of the central ring.

22. A threaded connection according to claim 20, characterized in that the end faces of the central ring are convex truncated cone surfaces with a vertex half-angle of at least 75°.

* * * * *

UNITED STATES PATENT AND TRADEMARK OFFICE
CERTIFICATE OF CORRECTION

PATENT NO. : 6,312,024 B1
DATED : November 6, 2001
INVENTOR(S) : Pierre Dutilleul et al.

Page 1 of 1

It is certified that error appears in the above-identified patent and that said Letters Patent is hereby corrected as shown below:

<u>Column 8,</u>
Line 9, change "200" to -- 20° --;

<u>Column 16,</u>
Line 26, delete "claim" (second use).

Signed and Sealed this

Second Day of April, 2002

Attest:

Attesting Officer

JAMES E. ROGAN
*Director of the United States Patent and Trademark Office*